INVENTOR
ALEXANDER ERIC MOULTON
BY
Shoemaker and Mattare
ATTORNEYS

United States Patent Office 3,479,053
Patented Nov. 18, 1969

3,479,053
VEHICLE SUSPENSIONS
Alexander Eric Moulton, Bradford-on-Avon, England, assignor to Moulton Developments Limited, Wiltshire, England, a British company
Filed June 19, 1967, Ser. No. 647,169
Int. Cl. B60g 21/06, 11/58
U.S. Cl. 280—104                                6 Claims

ABSTRACT OF THE DISCLOSURE

The vehicle wheel suspension system includes two hydraulically interconnected displacer units at each respective side of the vehicle, each displacer unit comprises a housing with a partition wall therein dividing the housing into first and second subchambers. A flexible diaphram closes the bottom end of the housing and forms a wall of the first subchamber. A piston member, connected for movement with an associated wheel, bears against the diaphragm. The partition carries valve controlled means opening into the second subchamber thereabove. A thick annular body of rubber forms a resilient wall for the second subchamber. A fluid interconnecting pipe connects the first subchamber of one displacer unit with a similar displacer unit associated with another wheel of the vehicle on the same side.

---

This invention relates to conjugate hydraulic suspension systems for automotive vehicles.

Suspension systems of the conjugate hydraulic type for automotive vehicles are known which comprise a pair of hermetically-sealed and liquid-filled hydraulic systems interconnecting longitudinally the front and rear wheel-suspension means at the respective sides of the vehicle and each including a pair of diaphragm-type hydraulic displacer units, associated individually with the respective interconnected wheel-suspension means, the hydraulic systems at the respective sides of the vehicle each including one or more springs each comprising a rubber hydraulic accumulator having an elastic wall, in which increase in hydraulic pressure resulting from deflection of the respective wheel suspensions produces resilient deformation of the elastic wall thereby springing in bounce and/or roll, and wherein there are included valves individual to each displacer unit which damp the suspension by controlling the flow of liquid in the respective hydraulic systems.

In versions of these systems, so far put into practical use, the respective units associated with the front and rear wheel suspensions on one side are hydraulically interconnected by a conduit pipe, there being no hydraulic interconnection traversely of the vehicle with the identical system formed on the opposite side. Each unit includes a displacer chamber and a spring chamber, the latter being in the form of an enclosed fluid filled chamber of variable volume having an elastic wall arranged resiliently to resist increase in the volume of the chamber. Communication between the displacer chamber and the chamber of variable volume is through ports in an intervening plate and these ports are controlled by valve means. Interconnection between the units associated with the front and rear wheels on one side of the vehicle is by providing a conduit pipe interconnecting the spring chambers of the respective units. In practice this means that the interconnection is made on the downstream side of the damper valves in the port plate if the displacer chambers are considered as on the upstream side. This has the effect that the pitch mode is invoked after the damping and coincidentally with the bounce mode.

In certain cases it may be desirable to provide means for separating the damping function in the pitching and bouncing modes, and the present invention is directed to this object.

Accordingly, the invention provides that in a vehicle suspension system of the conjugate hydraulic type hereinbefore specified, the interconnecting pipe is arranged to provide direct communication between the displacer chambers of the units of an associated pair with such interconnection being effected on the upstream side of the damper valve of each unit. The damper valves will still however, control flow of fluid between the displacer chamber and the hydraulic accumulator spring provided in the system. In this way damping in the bounce mode will be effected, as before, by the damper valves in the port plate, while these damper valves will no longer effect the pitch mode. Damping in this latter mode may be obtained by restriction means in the interconnecting pipe itself.

The interconnecting pipe may be connected to the displacer chamber through the piston operating in the latter.

Alternatively the interconnecting pipe may be arranged to communicate with the displacer chamber through the port plate.

Tests on vehicles fitted with this arrangement show that disturbances in the road invoke less of the higher frequency (stiffer) bouncing response with more of the excitation being dispersed by the more freely responding pitch mode.

This invention will be described with reference to the accompanying drawings, in which.

Figure 1:
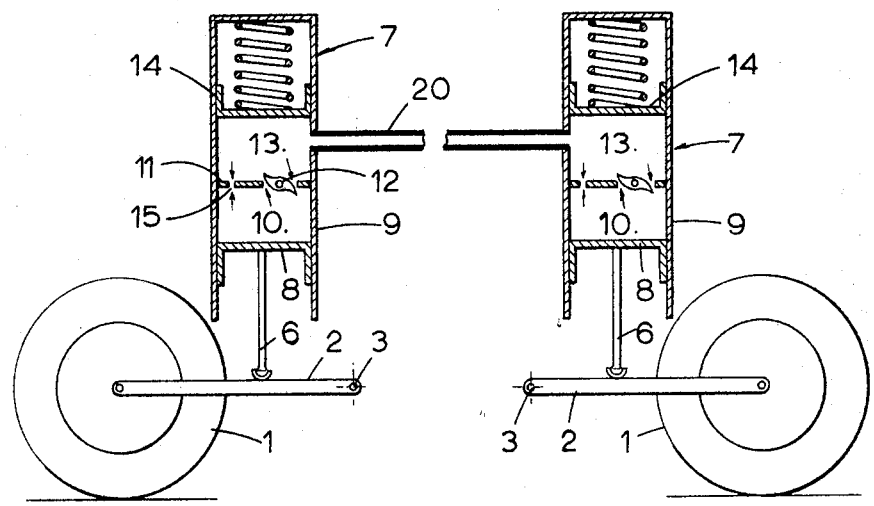
FIGURE 1 is a schematic diagram illustrating a known type of conjugate hydraulic suspension system as applied to the front and rear wheels on one side of an automotive vehicle.

Referring first to FIGURE 1 of the drawings, the wheels 1 of the vehicle are each carried on arms 2 pivotally mounted on journals 3 carried on the sprung structure of the vehicle.

In the case of the front wheels, the arms 2 will in practice constitute one arm of a quadrilateral or wishbone linkage and will preferably extend substantially transversely of the vehicle from the journals 3 which are disposed substantially longitudinally of the vehicle.

In the case of the rear suspensions, the arms 2 are preferably trailing arms depending rearwardly from journals 3 which are carried substantially transversely of the vehicle sprung structure.

The suspension arms 2 are associated with combined spring and hydraulic displacer units generally designated 7. The arms 2 are shown associated by means of struts 6 with a piston 8.

The piston 8 is moveable in and hermetically sealed to a housing 9. In practical embodiments the piston 8 is bridged to the housing 9 by means of a flexible diaphragm, so as to obtain hermetic sealing of a displacer chamber 10 which is defined in part by the piston 8 in part by the housing 9 and in part by a port plate 11. On movement of a wheel associated with a given displacer unit 7, fluid is displaced to or from the displacer chamber 10 through a double acting valve generally designated 12 and to or from a spring chamber generally designated 13 which has a resilient wall 14. The wall 14 is arranged resiliently to resist increase of pressure in the chamber of variable volume 13.

The two combined spring and displacer units 7 associated with the front and rear wheels 1 on one side of a vehicle are interconnected together by means of a conduit pipe 20 which has an inextensible bore and is suitably constituted over at least part of its length by a metal pipe. The conjugate hydraulic system so formed on one side of the vehicle is independent hydraulically of the identical system which is formed on the opposite side of the vehicle and each system has springs in the form of the resilient walls 14 arranged resiliently to resist increase of hydraulic pressure in the systems.

The hydraulic suspension systems will provide resilient support for the sprung structure of the vehicle on the vehicle wheels in the three main suspension modes, viz. bounce, pitch and roll.

The suspension is maintained in equilibrium by the provision of means which tend to urge the front and rear wheels to adopt a preselected position in relation to the sprung structure of the vehicle. Means for accomplishing this are fully described in British patent specification No. 870,489 and broadly consist firstly, in affording a suitable geometry to the wheel supporting arms and secondly, in providing that as each piston moves inwardly of the displacer chamber it progressively displaces more fluid from said displacer chamber.

In the suspension so far described with reference to FIGURE 1, interconnection between the units associated with the front and rear wheels on one side of the vehicle, is provided by the conduit pipe 20 interconnecting the spring chambers 13 of the respective units. This means that the interconnection is made on the downstream side of the damper valves 12 in the port plate 11, if the displacer chambers 10 are considered as on the upstream side. This has the effect that the pitch mode is invoked after damping and coincidentally with the bounce mode. In certain cases it may be desirable to provide means for separating the damping function in the pitching and bouncing mode. If all fluid displacements to and from the displacer chambers 10 are damped, the sprung structure is liable to have communicated to it an undesirable degree of disturbance invoked by high frequency excitation of the wheels. To overcome this, it has previously been proposed to provide small apertures indicated at 15 in the port plate 11 through which fluid may freely flow. However, a significant improvement is attained according to the present invention the damping function in the pitching and bouncing modes are completely separated.

Figure 2:
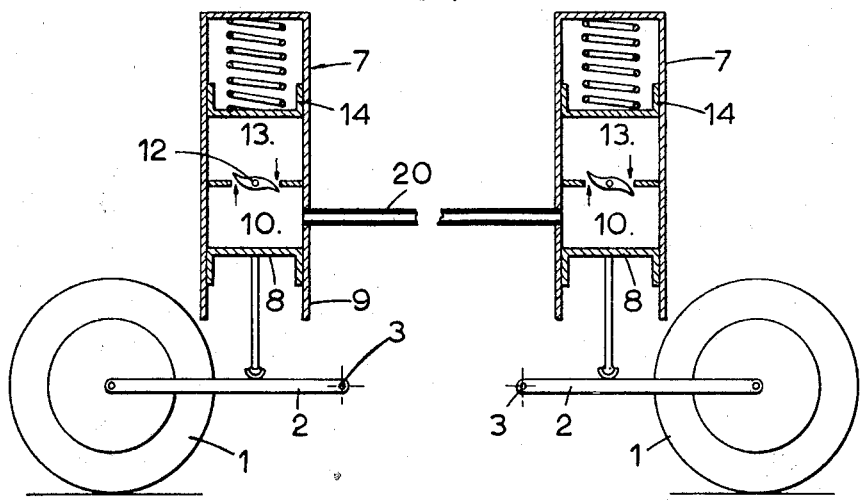
FIGURE 2 is a similar schematic diagram illustrating the system of FIGURE 1 modified in accordance with the present invention.

Referring now to FIGURE 2, it will be seen that the interconnecting pipe 20 is arranged to provide direct communication between the displacer chambers 10 of the front and rear units 7. Damper valves 12 still however control flow of liquid to and from the spring chambers 13. In this way damping in the bounce mode is effected as before by the damper valves 12, while this damper valve no longer has any controlling effect on the pitching mode. Any damping that is required in this latter mode may be obtained by either restricting the bore of the interconnecting pipe 20 or by providing restrictor valve means diagrammatically shown at 21 in the interconnecting pipe 20. However, the valve means 21 will in all cases have different operating characteristics than the valve means 12 in that the degree of damping effected by the valve means 21 will be lower than that of the valve means 12.

It will be appreciated that with the arrangement illustrated in FIGURE 2, high frequency oscillations of the wheels will mainly cause fluid to be displaced between the two interconnected displacer chambers 10 through the pipe 20 and only significant movements of the wheels will cause sufficient increase in pressure in the two chambers 10 and in the pipe 20 to cause the liquid to traverse the valve 12 into the spring chambers 13.

Figure 3:
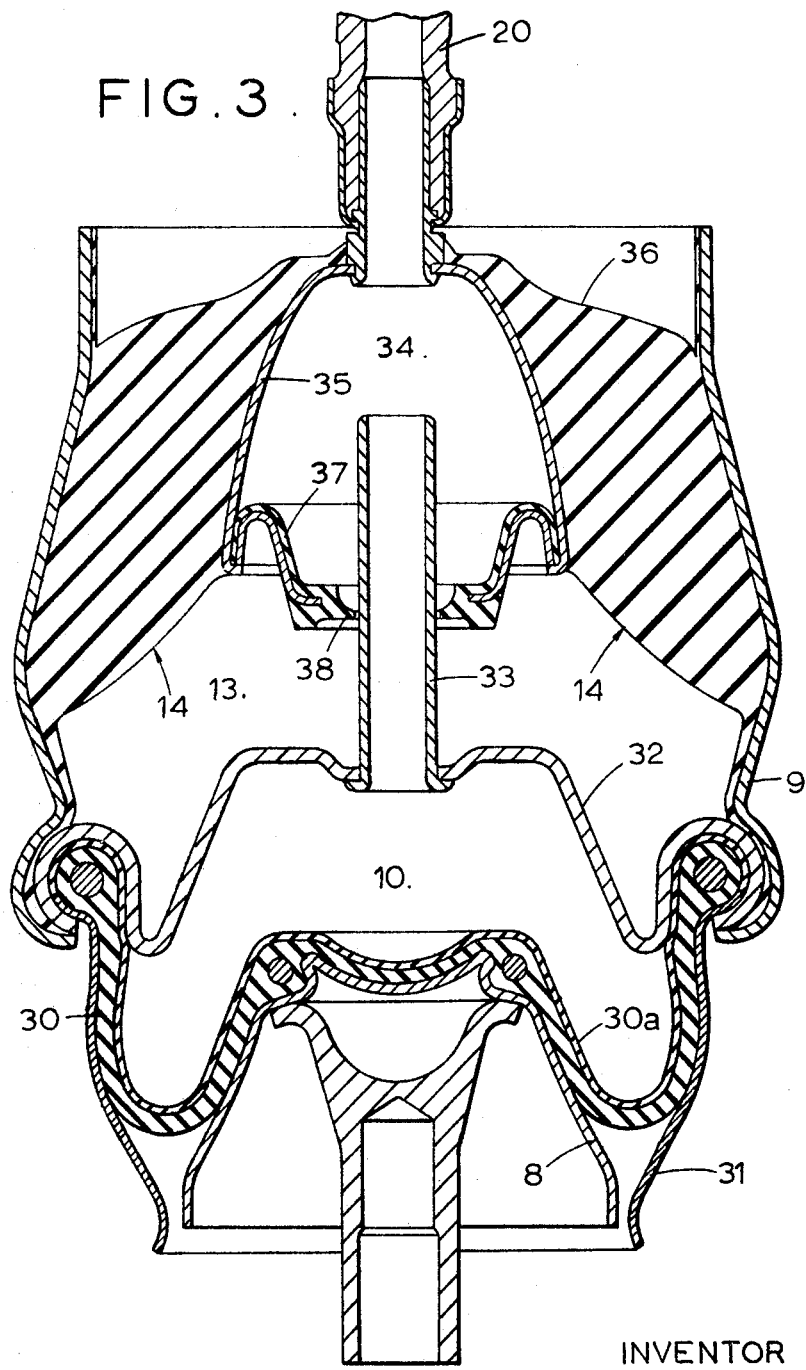
FIGURE 3 is a transverse cross-sectional view of a practical form of combined spring and hydraulic displacer unit intended for incorporation in the system schematically illustrated in FIGURE 2.

A practical embodiment of combined spring and displacer unit is shown in FIGURE 3 in which, 8 represents a piston which is bridged to housing 9 of the unit by means of a flexible diaphragm 30. 31 is a skirt which is also clamped to the housing 9 and being of metal controls the shape of the diaphragm 30 as the piston 8 moves inwardly of displacer chamber 10. The control of movement of the diaphragm 30 governed by the skirt 31 is such that as the piston moves inwardly of displacer 10, a progressively increasing volume of liquid is displaced from chamber 10 thus giving the displacer elements of the unit a rising rate.

32 represents a plate clamped to housing 9 and constituting an end wall of displacer chamber 10 and 33 is an outlet pipe leading to an intermediate chamber 34, which by means of the interconnecting conduit pipe 20 communicates with the corresponding chamber of an identical unit associated with the other wheel of the vehicle on the same side.

35 is a cup-like metal pressing between which and the inner wall of the housing 9 is bonded a hollow generally frusto-conical rubber body 36. Carried on the metal cup member 35 is a resilient valving member generally designated 37 which has an annular lip 38 which presses resiliently against the external surface of the tube 33. Fluid from the intermediate chamber 34 may only pass to a spring chamber 13 between the lip 38 and the tube 33, this involving deflection of the former. The chamber 13 is a chamber of variable volume whose elastic wall 14 is constituted mainly by the rubber body 36 and it will be understood that if the pressure of hydraulic fluid in chamber 13 increases, the rubber body will be deformed carrying with it cup member 35 with valving member 37 moving along pipe 33 towards the free end thereof.

Thus it will be seen that in this embodiment the spring chamber 10 is placed by means of pipe 33 and intermediate chamber 34 in direct communication with the inter-connecting pipe 20 without any intervening throttling valve means. Accordingly, there is free intercommunication between the chamber 10 of one displacer unit and the corresponding chamber 10 of the identical unit associated with the other wheel of the vehicle on the same side. Fluid will only reach the spring chamber 13 if the pressure in the system as a whole rises sufficiently to cause deflection of the annular flap 38 and allow the fluid to pass between the valving member 37 and pipe 33. On the other hand when the pressure in the system drops below the pressure in the chamber 13, the lip 38 will be deflected in the opposite direction allowing fluid to pass from the chamber 13 into the chamber 34 and to the remainder of the system.

When the rubber body 36 is deflected upon increase in hydraulic pressure in the chamber 13, because of the conical shaping both of the cup shape metal member 35 and of the region of the housing 9 to which the rubber body 36 is bonded, the deflection of the rubber body is both in shear and also in compression thus affording the suspension a rising rate in the bounce and roll modes; that is to say, that as pressure increases in the chambers 13 so the resilient resistance offered by the spring progressively increases.

Figure 4:
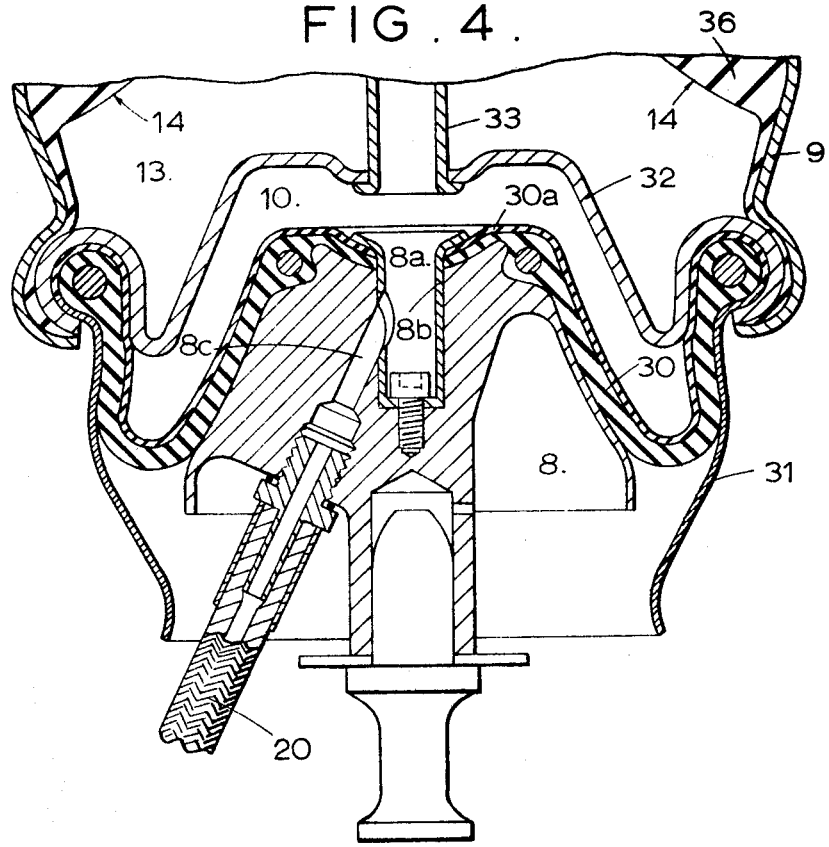
FIGURE 4 is a transverse cross-sectional view of a modified version of the unit illustrated in FIGURE 3.

A modification of the displacer unit shown in FIGURE 3 is illustrated in FIGURE 4, where like reference numerals designate similar or equivalent parts. In this embodiment instead of the interconnecting pipe 20 being led out of the metal cup member 35, it is led directly out of the displacer chamber 10 through piston 8. For the purpose the piston 8 is formed with a central cavity 8a which is lined by an insert 8b which is of metal and serves to clamp the central portion of diaphragm 30 and its neoprene liner 30a. The piston 8 in this embodiment is suitably a light alloy casting and is formed with a bore 8c providing intercommunication between the interconnecting pipe 20 and the cavity 8a.

The functioning of the embodiment illustrated in FIGURE 4 will be substantially similar to the embodiment shown in FIGURE 3 and in particular fluid will only pass the valve means 37 which isolate chambers 13 from the remainder of the system when the pressure of hydraulic liquid in the remainder of the system has risen sufficiently to overcome the resistance afforded by the valve means 37. In this way the valve means 37 will only serve to damp in the bounce and roll modes, the damping being effected both in bump and rebound. Damping in the pitch mode will be effected by appropriate selection by the size of the bore by the interconnecting pipe 20 or alternatively by the provision of damper means in said pipe 20. However, it will be appreciated that much heavier damping is required in the bounce and roll modes than is required in the pitching mode and if the same damping means operated in all three modes, damping in the pitching mode will be undesirably stiff. Hence provision for separating the two damping functions is provided for in this invention as shown in the embodiments illustrated in FIGURES 3 and 4.

Figure 5:
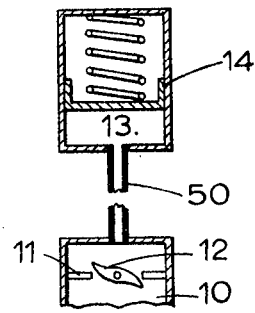
FIGURE 5 is a schematic diagram illustrating a modification of FIGURE 2.

As so far described we have only referred to the case where the displacer chamber 10 and the spring chamber 13 of the embodiments of FIGURES 2, 3 and 4 are combined in the same housing. However, the hydraulic accumulator spring need not necessarily be integral with the displacer unit and as shown in FIGURE 5, the arrangement of FIGURE 2 can be modified so that the spring chamber 13 is placed remotely from the displacer chamber and connected thereto by a pipe 50. Such an arrangement will function in the same way as the embodiment shown in FIGURE 2, with the valve 12 only operating to control flow of fluid to and from the spring chamber 13 and exercising no control of flow of fluid between the interconnected displacer chambers 10.

I claim:

1. A suspension system of the conjugate hydraulic type for automotive vehicles comprising a pair of hermetically-sealed and liquid-filled hydraulic systems interconnected longitudinally the front and rear wheel-suspension means at the respective sides of the vehicle and each including a pair of liquid filled hydraulic displacer units associated individually with the respective interconnected wheel-suspension means, the hydraulic systems at the respective sides of the vehicle each including one or more springs each comprising an hydraulic accumulator spring having an elastic wall, in which increase in hydraulic pressure resulting from deflection of the respective wheel suspensions produces resilient deformation of the elastic wall thereby providing springing in the bounce and roll modes, there being included also valves individual to each hydraulic accumulator spring which damp the flow of fluid to and from each hydraulic accumulator spring, said valves exercising no controlling influence over the flow of fluid between the two hydraulically interconnected displacer units at each respective side of the vehicle, and wherein each displacer unit comprises in combination an annular housing, a partition wall dividing the interior of said housing into first and second subchambers, a flexible diaphragm closing one end of the said housing and defining a flexible wall of said first subchamber, a piston member bearing on said diaphragm, an open ended tube mounted in said partition wall and opening into said first subchamber and extending into said second subchamber, a thick annular resilient body of rubber or like material disposed in said second subchamber, said body surrounding and being spaced from said tube, the outer periphery of said resilient body being tapered generally frusto-conical shape and being bonded to said housing which is correspondingly shaped, said resilient body having a hollow tapered bore within which is bonded a tapered metal cup-like member, the wider end of said tapered metal cup-like member being disposed around and spaced from the part of said open ended tube disposed in said second chamber, and said cup member mounting at its wider end an inwardly extending annular resilient member having at its inner periphery a continuous flexible lip bearing on the outer surface of said open ended tube.

2. A suspension system according to claim 1, wherein said first and second subchambers are liquid filled and are separated from one another, in part by said partition wall, in part by said open ended tube and in part by said inwardly extending annular resilient member mounted by said cup-like member, the arrangement being such that flow of liquid to or from said second chamber, results in lifting of said continuous flexible lip from engagement with said open ended tube.

3. A suspension system according to claim 1, including an interconnecting pipe connected to the narrower end of said cup-like metal member and communicating in identical manner with a similar displacer unit associated with another wheel of the vehicle on the same side.

4. A suspension system according to claim 1 and including an aperture centrally of said diaphragm and registering with a cavity formed in said piston, and including an interconnecting conduit pipe connected to said piston and opening into said cavity and communicating in identical manner with a cavity in a piston of a similar displacer unit associated with another wheel of the vehicle on the same side.

5. A suspension system for a four-wheeled automotive vehicle including provision for hydraulically effecting differential interaction between front and rear wheel suspension means located on the same side of the vehicle comprising, a sprung structure, a pair of wheels disposed at each side of said sprung structure, wheel suspension means operatively connected with each of said wheels, a diaphragm-type displacer unit operatively connected with each of said wheel suspension means, conduit means interconnecting the displacer units on each side of the vehicle with one another to provide a completely liquid-filled hydraulic system at each side of said sprung structure, each of said displacer units including a completely liquid-filled displacer chamber, defined in part by a rigid housing carried by said sprung structure, said displacer chamber being further defined by a flexible diaphragm, a piston member connected for movement with the associated wheel during operation of the suspension system, the head of said piston member bearing against said flexible diaphragm, said conduit means interconnecting the displacer units on each side of the vehicle with one another, providing free flow of liquid between the displacer chambers of the interconnected units, at least one of said displacer units having attached to its said rigid housing a tapered annular metal drum a thick annular resilient body of elastomeric material disposed within said drum, the outer periphery of said elastomeric body having a central hollow tapered bore within which is bonded a tapered metal cup-like member, said cup member with said elastomeric body forming a deformable wall defining part of a spring chamber which is liquid-filled and in liquid intercommunication with the displacer chamber of the unit, and including rubber flap valve means resiliently resisting liquid flow in both directions between the spring chamber and the displacer chamber.

6. A suspension system according to claim 5 and including an aperture centrally of said diaphragm and registering with a cavity formed in said piston, and wherein the conduit means providing hydraulic interconnection between the displacer units on the same side of the vehicle open into the cavity formed in the piston.

References Cited

UNITED STATES PATENTS 3,298,709  1/1967  Mercier _____ 280—104
3,054,624  9/1962  Nallinger _____ 280—104

FOREIGN PATENTS 890,852  3/1962  Great Britain.

PHILIP GOODMAN, Primary Examiner

U.S. Cl. X.R.

280—124